BEST AVAILABLE COPY
Aug. 6, 1935. G. GASTRICH Re. 19,662
ORNAMENTAL TOE REENFORCEMENT FOR STOCKINGS
Original Filed Jan. 25, 1933
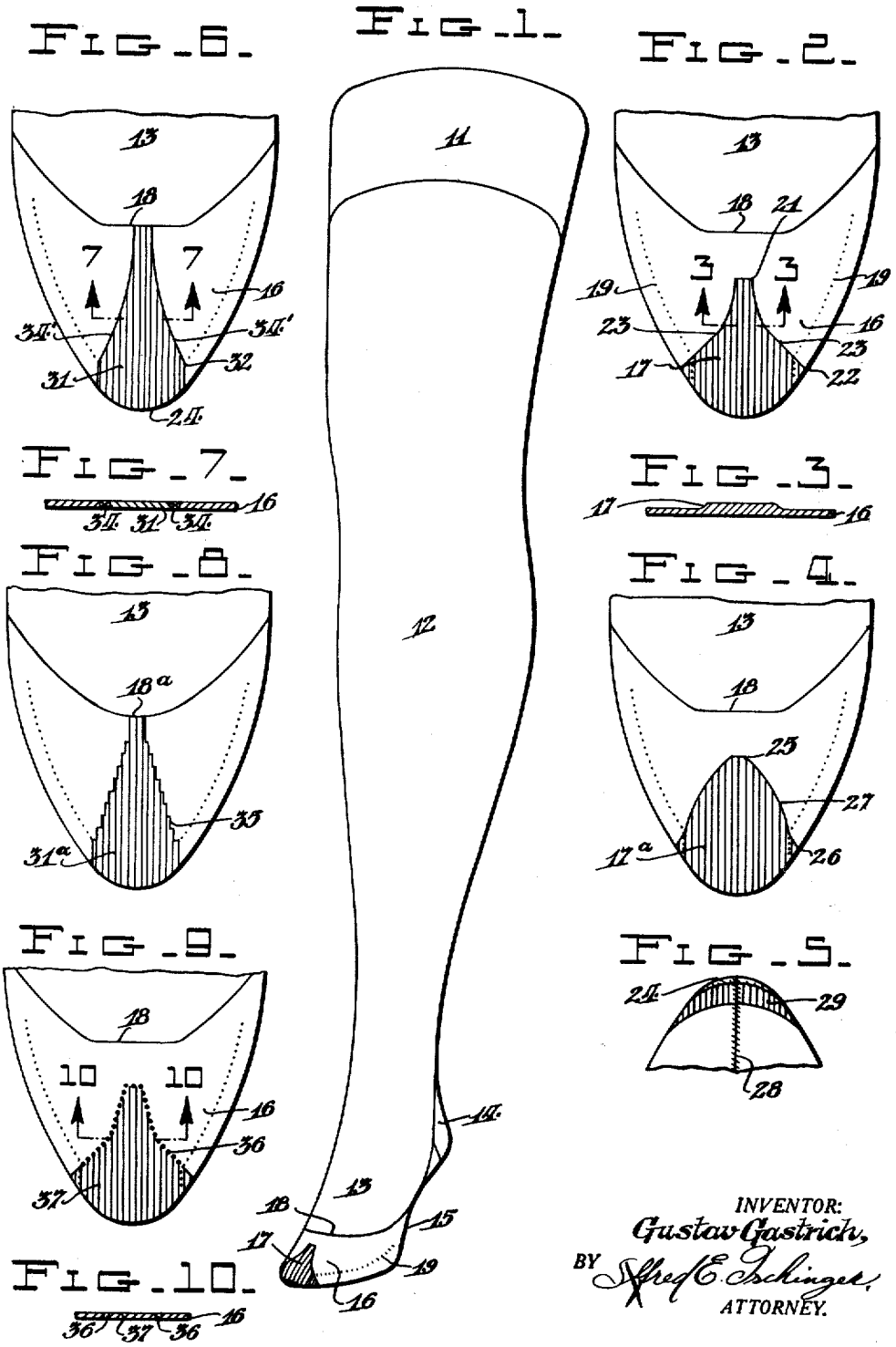
INVENTOR:
Gustav Gastrich,
BY Alfred E. Schinger,
ATTORNEY.

Reissued Aug. 6, 1935 Re. 19,662

UNITED STATES PATENT OFFICE 19,662

ORNAMENTAL TOE REENFORCEMENT FOR STOCKINGS

Gustav Gastrich, Wyomissing, Pa., assignor to Textile Machine Works, Wyomissing, Pa., a corporation of Pennsylvania Original No. 2,002,888, May 28, 1935, Serial No. 653,358, January 25, 1933. Application for reissue June 6, 1935, Serial No. 25,346

4 Claims. (Cl. 66—182)

This invention relates to stockings and particularly to improvements in stockings of the type having an extra reenforced or plated area in the center of the toe portion of the stocking and producing a wear-resistant area at that point.

The block-in-toe reenforcement heretofore generally employed is knit by the use of splicing blocks in the well known manner, and ends at or near the instep portion of the stocking with a generally rectangular or square outline, the sides of the reenforcement being parallel to each other for the entire height thereof, the upper end of which is square topped. This line of meeting between the block-in-toe reenforcement and the surrounding foot portion of the stocking has an unsightly appearance, causing the toe to appear broad and thick, which has a prejudicial effect on the prospective purchaser, and also is conspicuous when the stocking is worn with sandals or slippers of the open work or low cut type now commonly used.

In all reenforcing of the foregoing type, the quantity of thread and material per unit area is increased, and therefore in a stocking having a reenforcement of the block-in-toe type the elasticity of the toe portion is appreciably reduced, so that unless the toe portion is made unduly large a binding effect is present which prevents freedom of movement of the toes with the attendant discomfort when the stocking is worn.

An object of the invention is to produce a stocking in which the above detrimental features are eliminated, and having a reenforced toe portion which meets the surrounding foot portion in lines adapted to give a slenderizing effect to the toe, which may be produced in a variety of pleasing designs, and to produce a toe pocket of variable elasticity from the tip of the pocket toward the instep.

Another object is to increase the elasticity of the reenforced toe portion of a stocking, so that the toe portion may be made sufficiently narrow to present a pleasing appearance and to closely conform to the foot, and yet permit freedom of movement of the toes.

A further object of the invention is to reduce the necessary amount of silk or other yarn employed in knitting the toe reenforcement.

Still another object is to produce a toe reenforcement of the character described, which may be automatically produced on a full fashioned knitting machine by racking in the carrier stop control mechanism commonly employed for controlling the plating carriers used in knitting other portions of the stocking.

With these and other objects in view, which will become apparent from the following detailed description of several illustrative embodiments of the invention shown in the accompanying drawing, my invention resides in the novel stocking structure and method of making the same, as hereinafter more particularly pointed out in the claims.

In the drawing:

Fig. 1 is a perspective front view of a full fashioned stocking having a reenforced toe portion in accordance with the invention;

Fig. 2 is a plan view of a portion of the stocking foot of Fig. 1;

Fig. 3 is a cross-sectional view of the plated toe portion taken along the line 3—3 of Fig. 2;

Fig. 4 is a view of a toe reenforcement of different design;

Fig. 5 is a view of the under side of the toe portion showing a modified form of the invention;

Fig. 6 is a view of a toe reenforcement connected by split seams to the adjoining foot portion;

Fig. 7 is a cross-sectional view of the split seam reenforcement taken along the line 7—7 of Fig 6.;

Fig. 8 shows another form of toe reenforcement;

Fig. 9 illustrates an additional form of toe reenforcement; and

Fig. 10 is a cross-sectional view of the reenforcement taken along the line 10—10 of Fig. 9.

Referring to Fig. 1, there is shown a full fashioned stocking having a welt 11, leg portion 12, instep 13, heel portion 14, foot 15 and toe portion 16. Preferably, and as shown, the outline of the foot 15 is defined by a curved line 18 to give the foot portion a pleasing appearance, commonly referred to as a "cradle foot" design. The foot is narrowed as at 19, preferably in a manner to give the well known diamond point toe effect. In the specific embodiment shown, the foot portion of the stocking is reenforced throughout by a reenforcing or plating yarn and therefore comprises two yarns, although it will be understood that the reenforced foot portion may comprise a single wear-resistant yarn of heavier weight than that of the leg and instep portions.

In order to further reenforce the toe of the stocking thereby to provide greater wearing quality where the strain and wear on the stocking is most severe, the foot has an additional toe reenforcement 17. Referring to Fig. 2, the reenforcement 17 is shown as composed of successive courses of plating yarn interknit with the reenforced foot portion, the ends of the courses of the plated area 17 defining divergent curved lines 23 inclined to the wales and courses of the surrounding foot portion of the stocking, the toe reenforcement being relatively narrow at its upper portion 21 nearest the instep and gradually increasing in width to the widest part 22 of the reenforcement, thus forming a generally triangular shaped figure with the apex of the triangle adjacent the instep. It will be understood that the shade lines representing the convex surface of the reenforcement 17 extend walewise of the stocking, whereas the courses of the reenforcement extend transversely or coursewise of the stocking. From the point 22 the remaining courses of the reenforcement 17 are of the same length, the rounded effect of the reenforcement at the end of the toe being due to the curvature of the toe portion. By reason of the tapering upper portion of the toe reenforcement and the gradual increase in width in the manner shown, the toe reenforcement performs the utilitarian purpose of strengthening the stocking at the toe without detracting from the appearance of the stocking; in fact, the contour of the toe reenforcement produces an ornamental and slenderizing effect and enhances the appearance of the stocking. The effect of the curved outlines 23 also harmonizes with the curved outline 18 of the instep and thereby produces an overall pleasing effect in the foot portion. As shown by Fig. 3 the plated area 17 forms an integral part of the toe portion 16. The ornamental effect of the toe reenforcement may be enhanced by knitting this area from a yarn of a different color, or from a yarn of different weight or having other distinguishing characteristics, with respect to the yarn of the surrounding foot portion.

By reason of the tapering form of the toe reenforcement 17, the area of the toe portion to which the plating is applied is materially decreased, and therefore the inelastic area is substantially reduced. The elasticity of the toe portion is thus appreciably increased, so that the toe portion may be made to closely conform to the foot and still permit freedom of movement of the toes with the resulting increase in foot comfort when the stocking is worn. In other words, there is a band-like zone or area coursewise about the toe portion of the foot, which, by reason of the rearwardly-converging tapered reenforcing or less flexible toe tip area 17, and the forwardly-converging tapered more flexible areas at each side of the area 17 at the top of the foot, is rendered of gradually increasing radial flexibility walewise of the stocking from the toe tip toward the instep. Also, the amount of silk or other yarn required to produce the plated area is substantially reduced, thereby resulting in an appreciable saving in the amount of yarn used, without affecting the wear resistant action of the reenforcement. The tapered or curved outlines of the toe reenforcement are inclined to the wales and courses of the fabric, and this further increases the elasticity of the toe portion, and prevents or relieves stresses set up in or adjacent to the line of meeting of the toe reenforcement with the adjoining areas of the fabric.

The toe reenforcement disclosed may be automatically produced in a stocking on the "Reading" full fashioned knitting machine, or on any other similar type of machine, employing a yarn carrier stop control attachment for arresting in certain courses the travel of selected yarn carriers at different points intermediate the selvedge edges of the stocking, and commonly used, for example, in the production of various fancy heel designs. Mechanisms of the type suitable for the purpose and their manner of operation are shown and described in U. S. Letters Patent to Schletter 1,713,628, Bitzer 1,793,669, and Struve 1,833,310, and comprise the reenforced selvedge attachment described in detail in the "Reading" Full Fashioned Knitting Machine catalogue, pages 186–1 to 186–40, published May 1930 by the Textile Machine Works, Reading, Pennsylvania. By means of this attachment the travel of the plating carriers is controlled by pattern chain mechanism, the attachment being provided with a two needle movement in either direction, so that any of the forms shown herein may be produced thereby.

In knitting the stocking, the reenforced selvedge attachment on the footer operates in the well known manner to automatically rack stop members to different positions in predetermined courses to vary the travel of a plating yarn carrier on each side of the instep in such manner as to form the cradle foot outline 18 of the stocking. As the end of the instep portion is reached, one of the plating carriers is taken out of action, and the other plater is caused to traverse the entire width of the foot, along with the main yarn carrier. At the desired distance from the end of the instep, a plating carrier for the toe reenforcement 17 is put into action, and the right and left narrowing nuts on the reversely threaded spindle of the reenforced selvedge attachment, and the carrier stops controlled thereby, are racked to the proper position to give the desired length of the initial course 21 which determines the width of the upper part of the toe reenforcement. Usually, upon completion of the instep portion, the narrowing nuts and carrier stops controlled thereby are racked out to a position such that substantially no racking, or racking a slight distance only, of the narrowing nuts is required to give the proper position of the stops for beginning the toe reenforcement, and any such adjustment necessary may be automatically obtained by the pattern chain motion, or may be performed manually, as desired.

The plating carrier used for the toe reinforcement has two stops thereon which coact with associated stops of the reenforced selvedge attachment to determine the width of the reenforcement as outlined by the divergent lines 23, and the stops are racked inwardly in successive courses, or in selected courses, as determined by the usual pattern chain motion, the two needle movement obtainable with the attachment causing the travel of the plating carrier to increase in certain courses, thereby causing the courses of the plated area to progressively increase in length, so that the width of the toe reinforcement is progressively increased until at the point 22 it attains its greatest width. It will be understood, however, that any desired number of courses of the same length may be obtained, or that selected courses may be decreased in length with respect to adjacent courses, in order to enable any desired outline or contour of the toe reenforcement to be produced. One of the advantages of knitting the toe reenforcement in the foregoing manner is that when the part 22 of greatest width is reached, the narrowing nuts and associated stops of the reenforced selvedge attachment have been automatically racked in by the pattern chain motion to approximately the proper position to begin the plated portions of the foot of the next stocking blank to be knit on the machine, and therefore do not have to be manually racked a considerable distance to the proper position, as heretofore.

Fig. 4 shows a toe reenforcement 17a in which the plating courses between the points 25 and 26 progressively increase in length to give a convex outline 27.

Fig. 5 is a view of the bottom of the toe portion of a modification in which the toe reenforcement 17 is extended to the foot seam 28 to give an additional plated area 29 adjacent the toe seam 24. It will be understood that any of the plated areas of the reenforcements shown may be extended in the manner of Fig. 5, if desired.

Fig. 6 shows a modified form of the invention in which the toe reenforcement 31 is composed of one or more wear resistant yarns connected to the adjacent toe portion 16 by means of split seams 34, which may be either of the open split or closed split type known in the art, and may be automatically produced by the reenforced selvedge attachment above described. In the particular form shown, the upper end of the insert 31 meets the line 18 of the cradle foot, the courses of the reenforcement progressively increasing in length to the point 32 to produce the curved lines 34'; between the point 32 and the end of the toe the courses are preferably of the same length.

Fig. 8 shows another form of the invention in which the split seams which define the reenforcement 31a have a stepped formation 35, and the curvature of the cradle foot outline 18a is continued until it meets the upper part of the toe reenforcement, so that the narrowing nuts of the reenforced selvedge attachment have been racked out at this point to the position required for beginning the toe reenforcement.

Figs. 9 and 10 show a toe reenforcement 37 outlined by lace openings, preferably picot holes 38, thereby to enhance the ornamental effect of the reenforcement. Since the picot holes shown are formed by transferred or laterally displaced stitches, the same increase the flexibility and elasticity of the toe portion. The lace openings may, however, be formed by various other kinds of lace forming stitches.

While each of the various modifications illustrated is of different form or outline, it will be understood that any of the outlines or forms shown, or various other specifically different forms, may be employed with any of the modifications disclosed, and that the improvements shown and described by which I obtain the above results may be changed and modified in various ways without departing from the scope of the invention herein described and hereinafter claimed.

I claim:

1. A knitted stocking comprising a foot portion including an instep, and a toe pocket having in its top area a plurality of coursewise opposed substantially triangular flexible areas, each convergingly tapered walewise of the stocking toward the instep, and an intermediate relatively inflexible reenforcing area of substantially triangular form having a side along a course adjacent the pocket tip and its other sides along the respective adjacent sides of the flexible areas, said several areas together with the balance of the pocket constituting a toe portion of gradually increasing flexibility from the pocket tip rearwardly toward the instep portion.

2. A knitted stocking comprising a foot portion including an instep, a toe pocket and means for reenforcing the pocket and gradually increasing the flexibility thereof from the tip toward the instep, said means comprising a plurality of coursewise opposed substantially triangular flexible areas at the top of the pocket, each said area convergingly tapered walewise of the stocking toward the instep, and an intermediate relatively inflexible area of substantially triangular form having a side along a course adjacent the pocket tip and its other sides along the respective adjacent sides of the flexible areas, said intermediate area being of a substantially minimum quantity of yarn in accordance with a predetermined width adjacent the pocket tip.

3. A knitted stocking comprising an instep, a foot portion, a toe pocket composed of two threads, and means for reenforcing the pocket and gradually increasing the flexibility thereof from the tip toward the instep, said means comprising a plurality of coursewise opposed substantially triangular flexible areas at the top of the pocket, each said area convergingly tapered walewise of the stocking toward the instep, and an intermediate relatively inflexible tertiary-thread area of substantially triangular form having a side along a course adjacent the pocket tip and its other sides along the respective adjacent sides of the flexible areas.

4. A knitted stocking comprising an instep, a foot portion and a toe pocket, said pocket having a plurality of coursewise opposed substantially triangular flexible areas at the top thereof, each said area convergingly tapered walewise of the stocking toward the instep, and an intermediate relatively inflexible area of substantially triangular form having a side along a course adjacent the pocket tip and its other sides along the respective adjacent sides of the flexible areas, said intermediate area and said flexible areas being of dissimilar construction to produce differences in flexibility between said distinctive areas.

GUSTAV GASTRICH.